United States Patent
Bonnaud et al.

(10) Patent No.: US 8,172,178 B2
(45) Date of Patent: May 8, 2012

(54) DEVICE FOR GENERATING AERODYNAMIC DISTURBANCES SO AS TO PROTECT THE OUTER SURFACE OF AN AIRCRAFT AGAINST ELEVATED TEMPERATURES

(75) Inventors: Cyril Bonnaud, Toulouse (FR); Thomas Stevens, Tournefeuille (FR); Frédéric Roche, Blagnac (FR); Stéphane Dostes, Launaguet (FR)

(73) Assignee: Airbus Operations SAS, Toulouse (FR)

( * ) Notice: Subject to any disclaimer, the term of this patent is extended or adjusted under 35 U.S.C. 154(b) by 742 days.

(21) Appl. No.: 12/192,148

(22) Filed: Aug. 15, 2008

(65) Prior Publication Data
US 2009/0050742 A1 Feb. 26, 2009

(30) Foreign Application Priority Data
Aug. 24, 2007 (FR) ...................... 07 57155

(51) Int. Cl.
*B64C 1/38* (2006.01)
*B64G 1/58* (2006.01)

(52) U.S. Cl. ................. 244/117 A; 244/200.1; 244/204; 244/204.1

(58) Field of Classification Search ................ 244/53 B, 244/200.1, 204, 204.1, 91, 199.4; 60/39.091, 60/39.092
See application file for complete search history.

(56) References Cited

U.S. PATENT DOCUMENTS

| | | | |
|---|---|---|---|
| 3,578,264 A | | 5/1971 | Kuethe |
| 3,887,146 A | * | 6/1975 | Bright ........................ 244/12.1 |
| 3,974,646 A | * | 8/1976 | Markowski et al. ........... 60/737 |
| 4,117,995 A | * | 10/1978 | Runge .......................... 244/207 |
| 4,466,587 A | | 8/1984 | Dusa et al. |
| 4,696,442 A | | 9/1987 | Mazzitelli |
| 5,598,990 A | * | 2/1997 | Farokhi et al. ............. 244/200.1 |
| 6,105,904 A | * | 8/2000 | Lisy et al. .................. 244/200.1 |
| 6,644,598 B2 | * | 11/2003 | Glezer et al. .................. 244/208 |
| 6,837,465 B2 | * | 1/2005 | Lisy et al. .................. 244/204.1 |
| 7,334,760 B1 | * | 2/2008 | Lisy et al. ..................... 244/203 |
| 7,878,457 B2 | * | 2/2011 | Narramore ................. 244/200.1 |
| 2004/0129838 A1 | * | 7/2004 | Lisy et al. ..................... 244/199 |
| 2007/0018056 A1 | * | 1/2007 | Narramore ................. 244/200.1 |

FOREIGN PATENT DOCUMENTS
WO 2007/005687 A1 1/2007
* cited by examiner

*Primary Examiner* — Timothy D Collins
*Assistant Examiner* — Philip J Bonzell
(74) *Attorney, Agent, or Firm* — Young & Thompson

(57) ABSTRACT

An aircraft with an outer surface from which flows an aerodynamic stream of cold air and includes at least one hot gas outlet, characterized in that it includes at least one device (16) for generating aerodynamic disturbances so as to mix hot gas and cold air, whereby the at least one device is connected to an outer surface (10) for protection against the heat and/or close to a hot gas outlet (12).

14 Claims, 4 Drawing Sheets

Figure 4A:
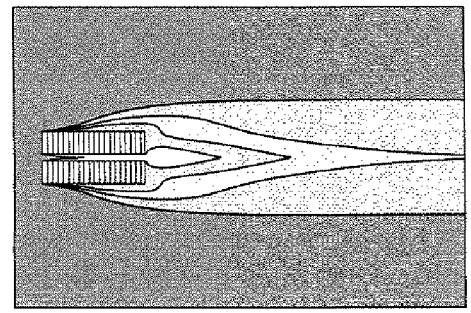

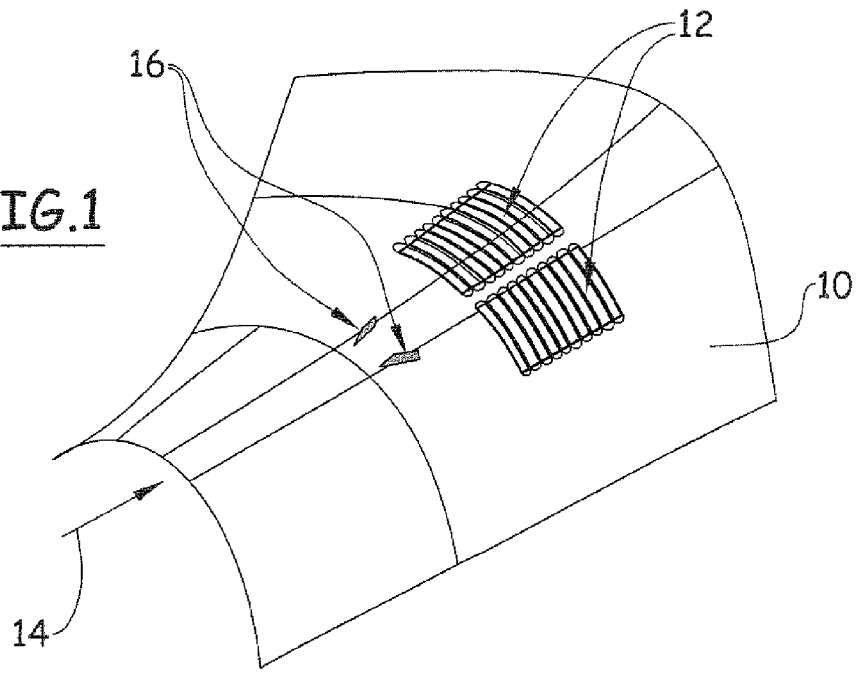
FIG.1
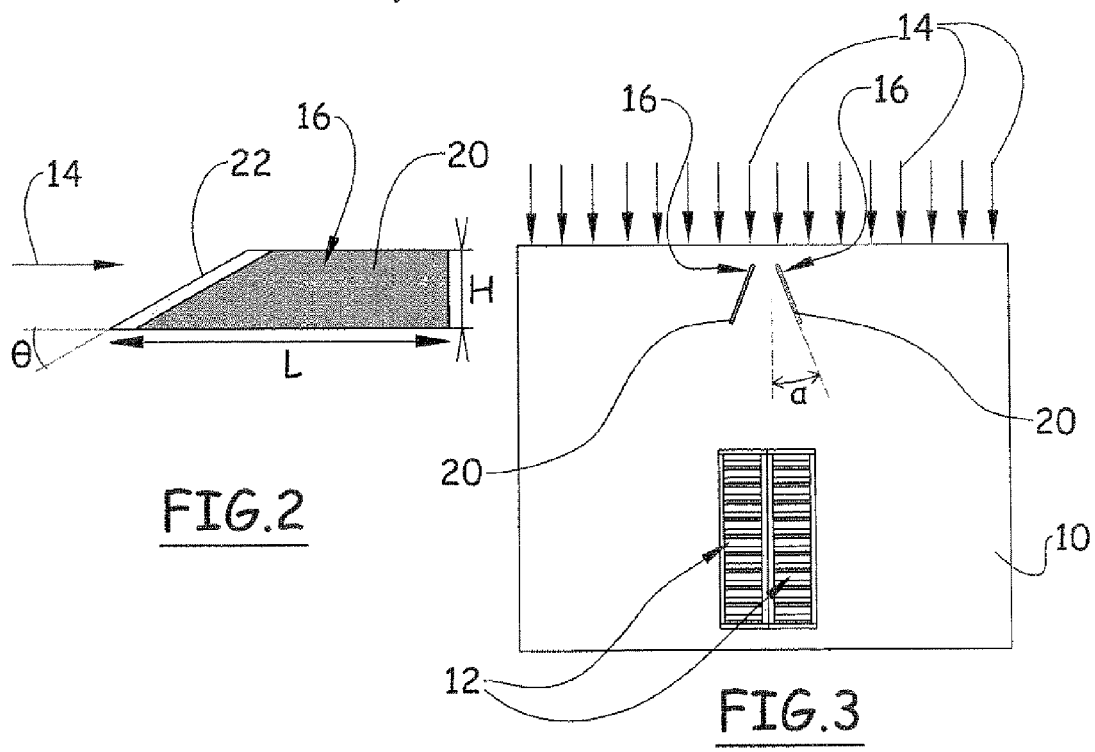
FIG.2
FIG.3

DEVICE FOR GENERATING AERODYNAMIC DISTURBANCES SO AS TO PROTECT THE OUTER SURFACE OF AN AIRCRAFT AGAINST ELEVATED TEMPERATURES

This invention relates to a device for generating aerodynamic disturbances so as to protect the outer surface of an aircraft against elevated temperatures, whereby said device is more particularly designed to be connected to a hot gas outlet of an aircraft.

An aircraft comprises various sources that can evacuate hot gases at the level of the outer surface in contact with the aerodynamic streams. Among these sources, the most significant is, of course, the power plant. Nevertheless, the air outlets that originate from the air conditioning systems inside the passenger compartment can also be significant sources of hot gas, whereby the amount of hot air evacuated is approximately proportional to the capacity of the aircraft.

Regarding the air conditioning systems, a first solution consists in reducing the temperature of the air before it is pushed back. However, this solution leads to providing additional cooling systems that tends to increase the on-board weight and therefore the consumption of the aircraft.

Another solution consists in protecting the outer surface that is able to be in contact with the hot gases. For this purpose, metal alloys that can withstand elevated temperatures are used, However, the identification of zones that can be in contact with hot air are difficult to determine because their ranges can vary based on the flying speed of the aircraft, complex phenomena of aerodynamics and aerothermy. In addition, certain movements of hot gas can occur on the surface in the form of a boundary layer that is difficult to model. Consequently, the zones that can be in contact with the hot gases are determined in very broad terms and are protected by using in particular metal materials to the detriment of composite materials. The determination is made in very broad terms at the time of design so as to limit the risks of subsequent modifications that have serious consequences.

This solution is not satisfactory because it does not make it possible to optimize the use of composite materials to constitute the outer surface of the aircraft. Furthermore, if, during flight tests, an unprotected zone is discovered to be in contact with a hot gas, then the modifications are necessarily significant and lead to greatly increasing the on-board weight and changing the production process sheets.

Essentially similar problems are found for the hot gases originating from the power plant. Even if in the case of a ducted-fan power plant, the hot gases that emerge from the power plant are channeled into a colder air passage that exits from the fan, the hot gases are generally in contact with the rear part of the mast that supports said power plant.

Consequently, the parts of the mast that can be in contact with the hot gases are not made of composite materials but of metal alloys that are more heat-resistant but also heavier.

According to other technical solutions, it is possible to consider installing a thermal shield or additional ventilation. However, all of these solutions lead to increasing the on-board weight of the aircraft.

As above, during the design stage, the zones that can be in contact with hot gases are determined in very broad terms, to the detriment of the optimization of the use of composite materials, so as to limit the risks of subsequent modifications.

Also, the purpose of this invention is to eliminate the drawbacks of the prior art by proposing a device that makes it possible to protect an outer surface of an aircraft against heat that does not significantly increase the weight of the aircraft, which makes it possible to optimize the use of composite materials and to reduce the risks of the presence of a fire ignition point.

For this purpose, the invention has as its object an aircraft with an outer surface from which flows an aerodynamic stream of cold air and that comprises at least one hot gas outlet, characterized in that it comprises at least one device for generating aerodynamic disturbances so as to mix the hot gas and the cold air of the aerodynamic stream, whereby said at least one device is connected to an outer surface for protection from the heat and/or close to a hot gas outlet. According to the variants, the device for generating the disturbances can be connected close to a hot gas outlet so as to process the hot gas at the source or away from a hot gas outlet on an outer surface that can be in contact with said hot gas so as to process the target.

Preferably, the device for generating disturbances can be retracted and is able to occupy two states, a first active state in which the device comprises a projecting part that can generate adequate aerodynamic disturbance that make it possible to mix the hot gas and the cold air effectively, and a second rest state in which said part that can project is flat against the surface to which the device is connected so as to generate a low aerodynamic drag.

Advantageously, the device for generating disturbances is made based on a material with shape memory that can change state based on the temperature. This solution makes it possible to obtain a retractable device of a simple and light design.

Figure 4B:
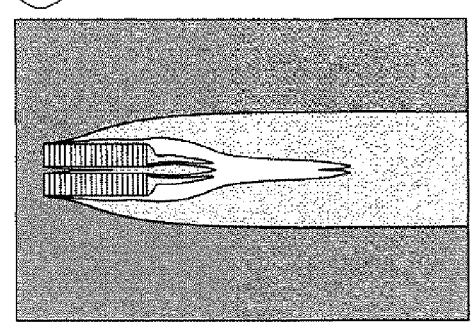
Figure 5A:
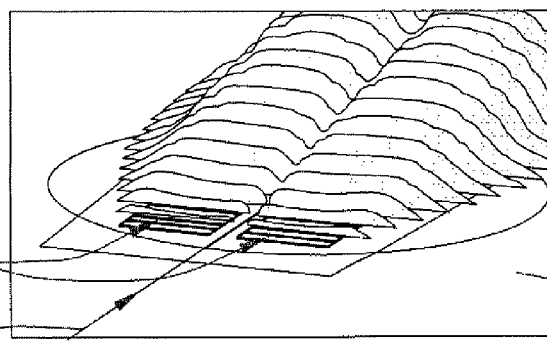
Figure 5B:
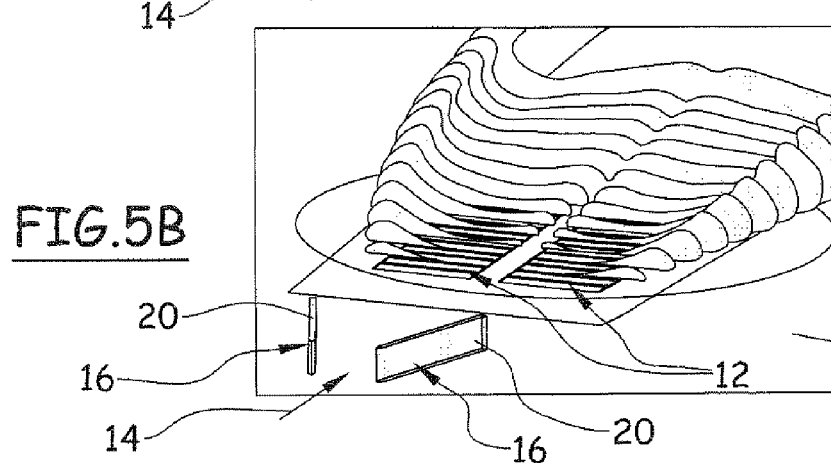
Figure 6A:
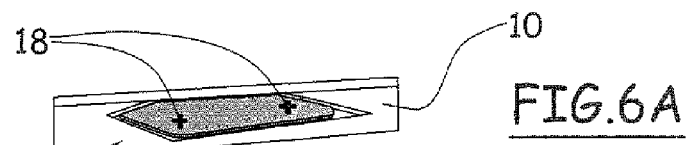
Figure 6B:
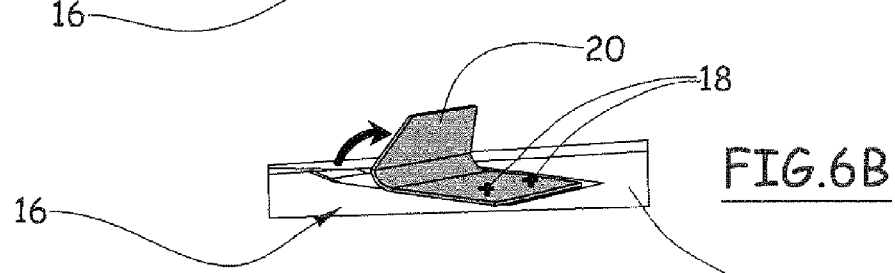
Figure 7A:
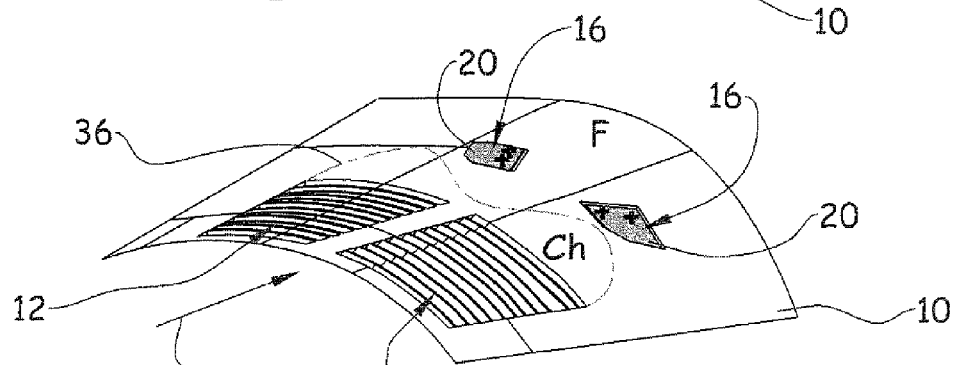
Figure 7B:
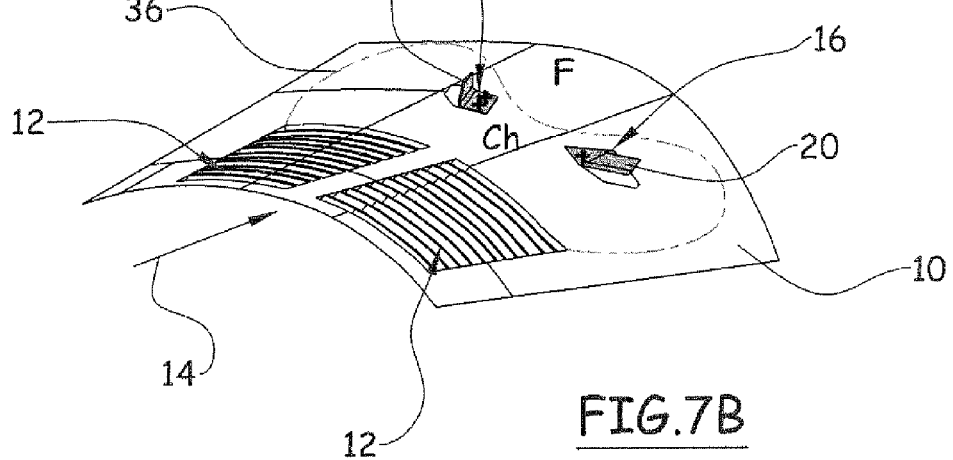
Figure 8:
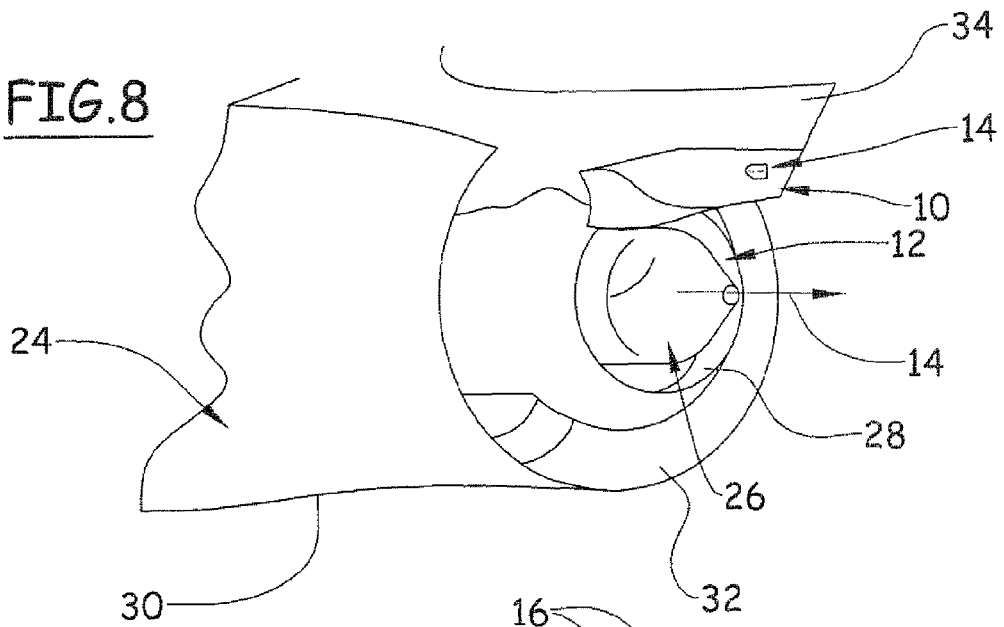
Figure 9A:
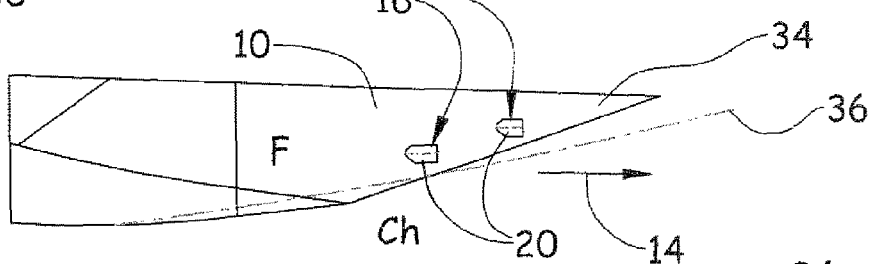
Figure 9B:
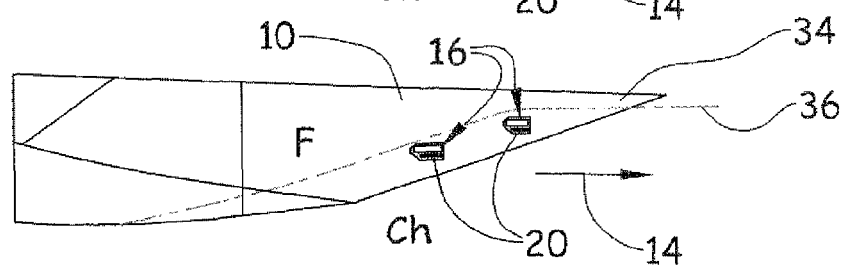
Figure 10:
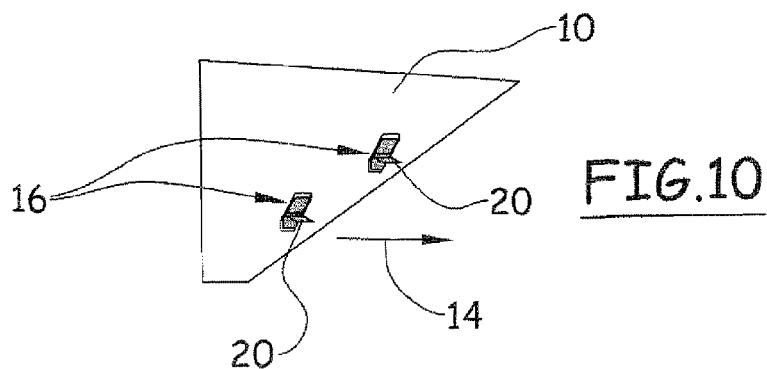

Other characteristics and advantages will emerge from the following description of the invention, a description that is provided only by way of example, taking into account the accompanying drawings, in which:

FIG. 1 is a perspective view that illustrates an outer surface of an aircraft where a hot gas outlet empties, whereby said surface is equipped with devices to generate disturbances, FIG. 2 is a side view of a device according to the invention, FIG. 3 is a top view that illustrates the various elements of FIG. 1, FIG. 4A is a diagrammatic representation that illustrates the temperature gradients at the level of a hot gas outlet according to the prior art, FIG. 4B is a diagrammatic representation that illustrates the temperature gradients at the level of a hot gas outlet that is equipped with devices according to the invention, FIG. 5A is a diagrammatic representation that illustrates the total pressure at the level of a hot gas outlet according to the prior art, FIG. 5B is a diagrammatic representation that illustrates the total pressure at the level of a hot gas outlet that is equipped with devices according to the prior art, FIG. 6A is a perspective view of a device according to the invention in a first retracted position, corresponding to the rest state, FIG. 6B is a perspective view of a device according to the invention in a deployed position corresponding to the active state, FIG. 7A is a perspective view of an outer surface of an aircraft that comprises a hot gas outlet, whereby said surface is equipped with devices of the invention in the rest state, FIG. 7B is a perspective view of an outer surface of an aircraft that comprises a hot gas outlet, whereby said surface is equipped with devices of the invention in the active state, FIG. 8 is a perspective view of the rear of a propulsion system of an aircraft, FIG. 9A is a side view of the rear part of a mast that is equipped with devices according to the invention in the rest state, FIG. 9B is a side view of the rear part of a mast that is equipped with devices according to the invention in the active state, and FIG. 10 is a side view of an outer surface that is protected from heat by devices according to the invention that are illustrated in the active state.

FIG. 1 shows an outer surface 10 of an aircraft.

Outer surface is defined in general as a surface at the level of which the outside air flows when the aircraft is in motion.

A hot gas outlet is shown at 12. According to the illustrated example, the hot gas outlet is connected to said outer surface and comes in the form of at least one grid that may have different shapes and sizes. However, the invention is not limited to this embodiment. Thus, the hot gas outlet can be arranged at the level of the outer surface that is to be protected or can be at a distance from said surface.

Hot gas is defined as a hot gas or a mixture of hot gases, hot corresponding to a temperature of greater than or equal to 50° C.

The relative movement of the surrounding air relative to the outer surface called aerodynamic stream is indicated by the arrow or arrows 14 in the figures.

The hot gas that exits from the outlet 12 flows at the level of the outer surface in the same direction as the aerodynamic stream.

According to the invention, at least one device 16 for generating aerodynamic disturbances is connected to the outer surface 10 to be protected against the heat and/or close to the hot gas outlet 12.

This device 16 comprises means 18 for attachment to the outer surface and at least one first part 20 that is able to project relative to the outer surface 10 so as to generate aerodynamic disturbances so as to prevent the flow of hot gases in the form of a uniform flow. Actually, in the absence of the device 16, the hot gas has a tendency to flow on the surface, held flat against the outer surface by the aerodynamic stream. Consequently, the hot gas does not mix quickly with the aerodynamic stream of cold air, although it maintains a high temperature over a large range as illustrated in FIG. 4B.

According to one embodiment, the projecting part 20 comes in the form of a plate that is essentially perpendicular relative to the outer surface to which it is connected, oriented so as to make a non-zero angle $\alpha$ with the direction 14 of the aerodynamic stream. As a variant, the projecting part could have other shapes. Thus, the projecting part can be a complex, non-plane surface, or the combination of plane surfaces and/or complexes.

Preferably, the angle $\alpha$ varies from 10 to 40°. According to a preferred embodiment, the plate 20 makes an angle $\alpha$ on the order of 20° with the direction 14 of the aerodynamic stream.

According to a preferred embodiment, the ratio between the length L and the height H of the plate, L/H, is on the order of 4.

The plate 20 has an upstream edge 22 that makes an angle $\theta$ with the outer surface that varies from 30 to 90°. Preferably, the upstream edge 22 is inclined by an angle $\theta$. Preferably, this upstream edge 22 is tapered and comprises a beveled profile.

According to a first configuration, at least one device 16 for generating disturbances can be placed upstream from the hot gas outlet in the flow direction of the aerodynamic stream, as illustrated in FIGS. 1, 3, 4B and 5B. In this case, the device 16 generates disturbances at the level of the aerodynamic stream of cold air upstream from the outlet 12 that contributes to a better mixing of the hot gas evacuated through the outlet with the colder air of the aerodynamic stream.

According to this configuration, the distance that separates the device 16 from the outlet 12 is on the order of 10 H, whereby H is the height of the device.

FIGS. 4A and 4B show the ratio n=(T-Text)/(Tjet-Text), with T the temperature measured at the point under consideration, Text the temperature of the aerodynamic stream on the order of 15° C., and Tjet the temperature of the hot gas that is evacuated through the outlet 12 on the order of 100° C.

According to the illustrated example, an outlet 12 is selected in the form of two grids, two devices 16 for generating disturbances being arranged upstream from said grids, each to the right of a grid, whereby the devices come in the form of divergent plates, making a V whose point is oriented upstream in the flow direction of the aerodynamic stream. However, it would be possible to use convergent plates.

According to the prior art, as illustrated in FIG. 4A, in the absence of a device, it is noted that the hot gas maintains a temperature of more than 60° C., or n is greater than or equal to 0.7, over a distance on the order of 0.46 m.

In the presence of at least one device 16, as illustrated in FIG. 4B, the hot gas maintains a temperature of more than 60° C., or n is greater than or equal to 0.7, over a distance on the order of 0.23 m.

Thus, the presence of at least one device makes it possible to reduce significantly the range of the outer surface that can be in contact with an elevated temperature.

In FIGS. 5A and 5B, the total pressure is shown at the level of the outlet 12 for the same configuration as the one that is illustrated in FIGS. 4A and 4B.

It is noted that in contrast to the prior art, the devices 16 generate disturbances that tend to deflect the hot gas on both sides of the outlets, in the direction 14, making it possible to improve the mixing between the hot gas and the cold air of the aerodynamic stream.

According to another configuration, at least one device 16 for generating disturbances can be placed downstream from an outlet 12, as illustrated in FIGS. 7A and 7B. In this case, the device(s) 16 generate(s) disturbances at the level of the hot gas flow and the cold aerodynamic stream contributing to a better mixing of hot gas that is evacuated through the outlet with the colder air of the aerodynamic stream.

According to another configuration, at least one device 16 for generating disturbances can be provided at the level of any surface that is to be protected against heat, whereby said surface is more or less distant from a hot gas outlet. This configuration is more particularly suited for protecting a certain portion of the mast that can be in contact with a hot gas that emerges from the propulsion system.

In FIG. 8, a propulsion system that comprises a power plant 26 that is arranged in a first duct 28 at the rear end of which flows a primary flow of hot gas is shown at 24, whereby said power plant is arranged in a nacelle 30 that delimits a second duct 32, essentially concentric to the first duct 28, at the rear end of which flows a secondary stream of cold air driven by a fan that is arranged at the level of the air input of the nacelle (not shown). The propulsion system 24 is connected to the remainder of the aircraft by a mast 34. According to the configurations, the propulsion system can be suspended under the wing of the aircraft, connected to the wing, or connected via the mast to the fuselage of the aircraft.

For certain phases of the flight, the rear part of the mast can be in contact with the hot gas that is obtained from the power plant.

According to the invention, at least one device 16 for generating disturbances can be arranged at the level of the surface of the mast for protection from the heat. According to this variant, the device is not arranged upstream or downstream from a hot gas outlet but at the level of a surface to be protected away from the hot gas outlet, as illustrated in FIGS. 9A, 9B and 10. In this case, the device(s) 16 generate(s) disturbances at the level of the hot gas flow that can flow against the surface to be protected and the cold aerodynamic stream contributing to a better mixing of hot gas with the colder air of the aerodynamic stream.

By way of example, it is possible to maintain a temperature on the order of 100° C. in this zone, whereas without device 16, the temperature could reach 250° C.

The number of devices as well as their arrangements are adjusted based on temperatures that are measured on the surface so that said temperatures do not exceed a certain threshold based on the materials that are used for the outer surface.

Another advantage of the device resides in the ease with which it can be installed on the surface to be protected, by gluing, by welding, by riveting or the like.

Furthermore, its installation does not require any modification of the structure of the aircraft.

Using the device of the invention, it is possible to optimize the use of the composite materials for the outer surface. Actually, at the time of design, certain parties that can be in contact with the hot gases can be equipped with devices according to the invention so as to reduce the surface temperature. In addition, even if this protection were to prove inadequate during flight tests, it is possible to adjust the protection by implanting the devices in a different manner or by increasing their numbers without modifying the process of production of the structure of the aircraft.

According to another characteristic of the invention, the device 16 of the invention is retractable and able to occupy two states, a first active state illustrated in FIGS. 6B, 7B and 9B, in which the device comprises a projecting part 20 that can generate sufficient disturbances that make it possible to mix the hot gases and cold air effectively, and a second so-called rest state illustrated in FIGS. 6A, 7A and 9A, in which said part 20 that can project is flat against the outer surface so as to generate a low aerodynamic drag.

This configuration makes it possible to reduce the impact of devices 16 on the aerodynamic characteristics of the aircraft, in particular on the drag. Actually, a rigid device would permanently produce a reduction of the aerodynamic characteristics of the aircraft whereas its usefulness as a means of protection against the heat can be limited over time, in particular at certain phases of the flight.

In the case where the projecting part can be retracted and come to the rest state, the device for generating the disturbances does not alter the aerodynamic characteristics of the aircraft permanently but only when it is used to protect the outer surface against the heat in the active state.

Advantageously, the device 16 changes state based on temperature. According to a preferred embodiment, the device 16 for generating disturbances is based on a shape memory material.

Thus, when the temperature is less than a predetermined threshold, the device is in the rest state. When the temperature exceeds said threshold, then the device deforms using shape memory material so as to occupy the active state.

FIGS. 7A, 7B, 9A and 9B show the change of state of the devices 16 for generating disturbances.

The line 36 in broken lines corresponds to the limit between a zone F whose temperature is less than the threshold temperature and a zone Ch whose temperature is greater than F. Thus, when the devices 16 are in the zone F (FIGS. 7A and 9A), they are in the rest state and practically do not alter the aerodynamic characteristics of the aircraft.

During certain phases of the flight, the line 36 can move and the zone Ch can be extended. As soon as the zone Ch reaches the devices 16 to generate disturbances, the latter are subjected to a temperature for which the devices change state and pass into the active state so as to protect the outer surface against heat by promoting the mixing between hot gas and cold air.

The use of a shape memory material makes it possible to obtain a retractable device 16 of simple design and avoids the use, on the one hand, of a sensor for detecting the temperature of change of state, and, on the other hand, of an actuator and an articulation for modifying the position of the projecting part.

By way of example, it would be possible to use a shape memory material such as an alloy based on titanium and nickel marketed under the trademark Nitinol®.

The invention claimed is:

1. An aircraft with an outer surface from which flows an aerodynamic stream of cold air, comprising:
    at least one hot gas outlet; and
    at least one device (16) for generating aerodynamic disturbances connected to the outer surface (10) upstream from a hot gas outlet (12),
    wherein said at least one device (16) for generating aerodynamic disturbances and said at least one hot gas outlet (12) are aligned in a flow direction of the aerodynamic stream so as said at least one device (16) generates disturbances at a level of the aerodynamic stream of cold air upstream from the outlet (12) that contributes to mixing of the hot gas evacuated through the outlet (12) with the colder air of the aerodynamic stream,
    wherein a distance that separates the device (16) for generating the disturbances and the hot gas outlet (12) is on the order of 10H, whereby H is a height of said device.

2. The aircraft according to claim 1, wherein said at least one device (16) for generating disturbances comprises means (18) for attachment and at least a first part (20) that can project in a form of a plate.

3. The aircraft according to claim 2, wherein the plate (20) has an inclined upstream edge (22).

4. The aircraft according to claim 2, wherein said at least one device (16) for generating disturbances is retractable and able to occupy two states, a first active state in which said at least one device comprises a projecting part (20) that can generate adequate disturbances that make it possible to mix the hot gas and the cold air effectively, and a second rest state in which said part (20) that can project is flat against the surface to which the device is connected so as to generate a low aerodynamic drag.

5. The aircraft according to claim 2, wherein the plate (20) with the direction of the aerodynamic stream makes an angle α on the order of 10 to 40°.

6. The aircraft according to claim 5, wherein the plate has a length L and a height H with a ratio L/H on the order of 4.

7. The aircraft according to claim 5, wherein the plate (20) has an inclined upstream edge (22).

8. The aircraft according to claim 2, wherein the plate has a length L and a height H with a ratio L/H on the order of 4.

9. Aircraft according to claim 8, wherein the plate (20) has an inclined upstream edge (22).

10. The aircraft according to claim 1, wherein said at least one device (16) for generating disturbances is retractable and able to occupy two states, a first active state in which said at least one device comprises a projecting part (20) that can generate adequate disturbances that make it possible to mix the hot gas and the cold air effectively, and a second rest state in which said part (20) that can project is flat against the surface to which the device is connected so as to generate a low aerodynamic drag.

11. The aircraft according to claim 10, wherein said at least one device (16) for generating disturbances changes state based on a temperature.

12. The aircraft according to claim 11, wherein said at least one device (16) for generating disturbances is produced based on a shape memory material.

13. An aircraft with an outer surface from which flows an aerodynamic stream of cold air, comprising:

a hot gas outlet with two grids and two devices for generating aerodynamic disturbances connected to the outer surface (10) upstream from said at least a hot gas outlet (12), wherein each device (16) for generating aerodynamic disturbances is aligned with one grid in a flow direction of the aerodynamic stream, wherein a distance that separates the device (16) for generating the disturbances and the hot gas outlet (12) is on the order of 10H, whereby H is a height of said device.

14. The aircraft according to claim 13, wherein the devices come in a form of divergent plates forming a V whose point is oriented upstream in the flow direction of the aerodynamic stream.

* * * * *